Aug. 16, 1938.  S. MOORE  2,127,183
HEAT SEALING DEVICE
Original Filed June 12, 1935   2 Sheets-Sheet 1
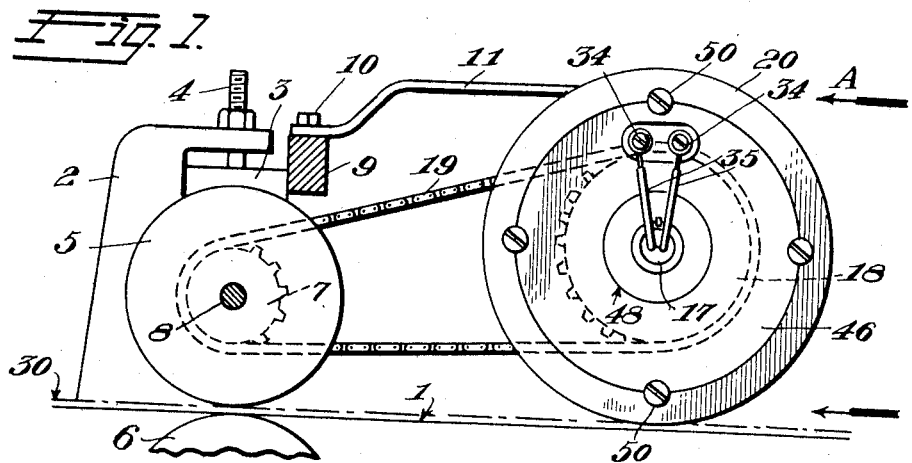
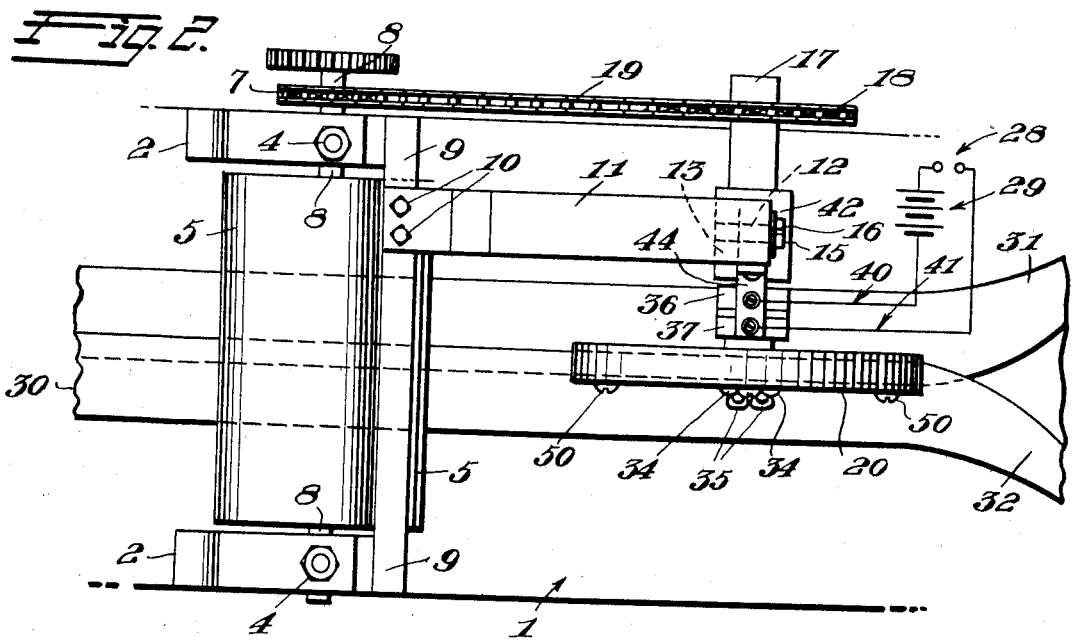
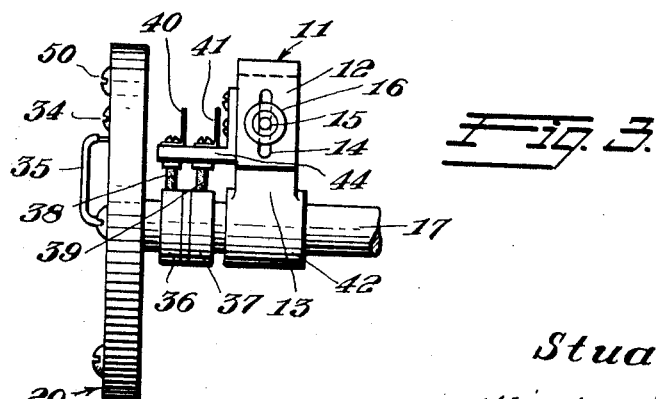
Inventor
Stuart Moore.
By William C. Linton.
Attorney

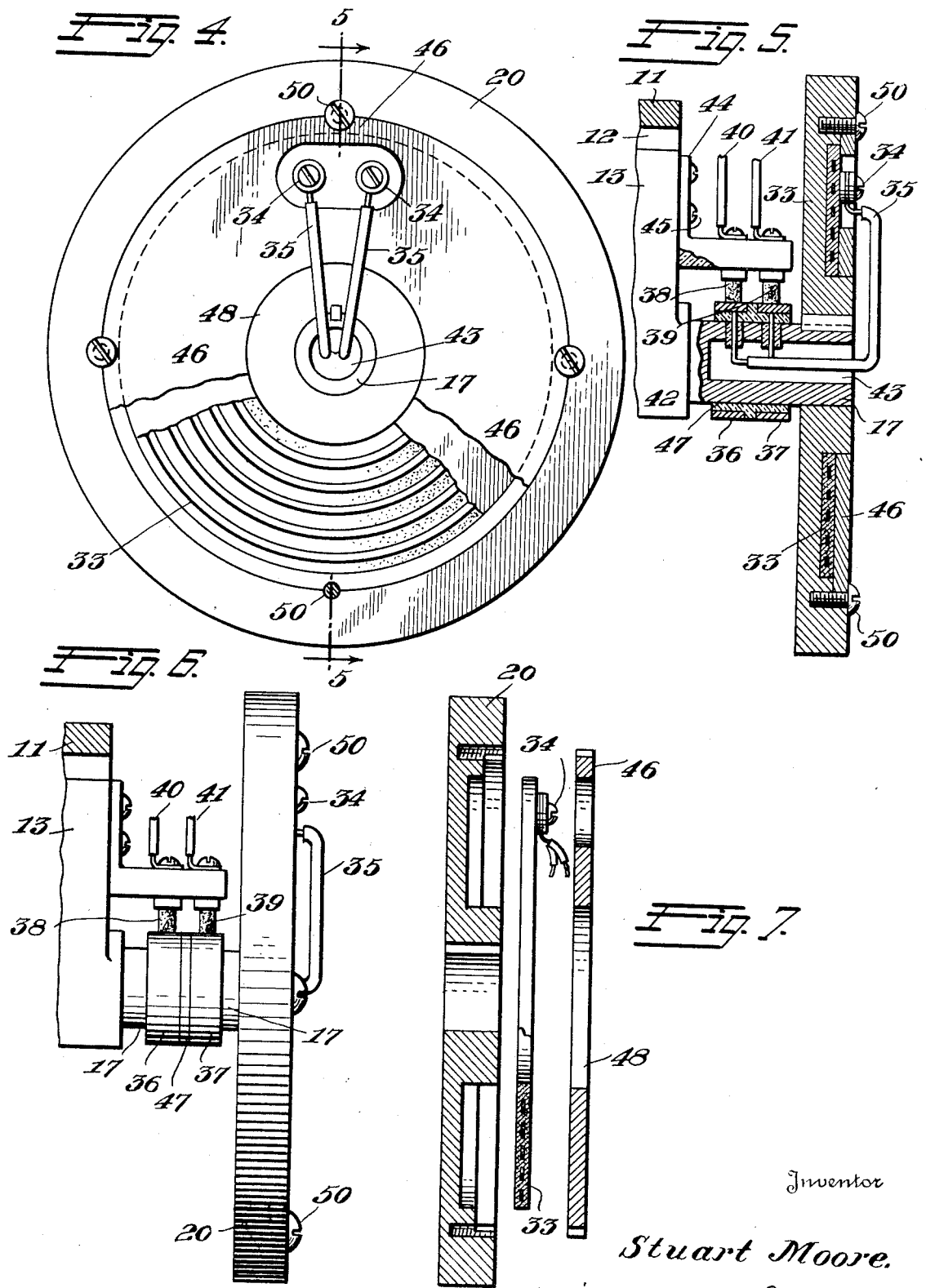

Patented Aug. 16, 1938

2,127,183

UNITED STATES PATENT OFFICE 2,127,183

HEAT SEALING DEVICE

Stuart Moore, Dallas, Tex., assignor to Dixie Wax Paper Company, Dallas, Tex., a corporation of Texas Original application June 12, 1935, Serial No. 26,255. Divided and this application September 30, 1937, Serial No. 166,637

4 Claims. (Cl. 219—19)

My invention relates to electrical heaters and more particularly to a heating disc used for sealing bags or other containers made from waxed, paraffined, rubber, adhesive or the like coated papers. The present application is a division of my copending application filed June 12, 1935, Serial No. 26,255.

Papers which have been treated or coated with wax, paraffin, gums, resins, or similar adhesives as well as rubber derivatives or similar thermoplastic compositions which when heated become adhesive, may be sealed when forming the papers into bags, boxes, wrappers or containers for merchandise by folding the papers in order that their edges may meet, whereupon, a suitable heater may be applied whereby the coatings will become adhesive at particular points where a seal is to be effected and at a required length of time and it is an object of the present invention to provide a heat sealing disc suitable for the above sealing requirements.

A further object of the invention is to provide an electrical heater which may be easily and readily applied to the conventional bag making, automatic heat sealing and bread wrapping or the like machines intended for use in the forming of containers or wrappers made from papers and which when applied, will effectively apply heat to the particular edges or parts of the papers to be sealed together without retarding the speed of the container or wrapper making machines.

A still further object of the invention is to provide a simple, compact and comparatively inexpensive electrical heater suitable for use as a sealing device for the above mentioned coated or treated papers.

Other objects of my invention will be in part obvious and in part pointed out hereinafter.

In order that the invention and its mode of operation may be readily understood by persons skilled in the art, I have in the accompanying illustrative drawings and in the detailed following description based thereupon, set out an embodiment of the same.

In the drawings, wherein like characters of reference designate corresponding parts throughout:

Fig. 1 is a side elevation of my improved electrical heater showing the same as diagrammatically applied to a bag making machine.

Fig. 2 is a plan view of Fig. 1, showing the course of the formed overlapping edges of the paper web past the sealing apparatus.

Fig. 3 is an edge view of the sealing disc and supporting and current supplying parts.

Fig. 4 is a face view of the sealing disc with parts removed, showing the spiral electrical heating element, the plate for retaining the heating element, and the current leads.

Fig. 5 is a cross-sectional view of the sealing disc taken on the line 5—5 of Fig. 4.

Fig. 6 is a detail view of the assembled sealing disc and heating element and supporting and current supplying parts.

Fig. 7 is a sectional view of the several parts of the sealing disc with the parts separated in juxtaposition, showing the electrical heater element and its retaining plate.

In Fig. 1, I represents the bed of a commonly used bag making machine, over which passes the formed paper web 30 after it has been folded over to form the longitudinal seam of the bags to be manufactured from separate edge folds of the paper 31 and 32. At each side of the bed I is provided a pair of oppositely positioned bearing supports 2, each carrying a bearing member 3. The bearing members 3 are mounted in their respective supports 2 for variable adjustment by means of a set bolt 4 which may be completely disengaged from the bearing members to permit the removal of the latter when desired.

A pair of feed rolls are positioned intermediate the bearing supports 2, comprising the upper feed roll 5 and the lower feed roll 6. The upper feed roll 5 is mounted on a shaft 8 which is carried on the bearing members 3. One end of the shaft 8 projects beyond a bearing member 3, and carries on its extended portion a sprocket wheel 7.

Rigidly fixed to the normal forward portion of the bearing 3 and mounted above the bed I of the machine in substantial parallel relation to the feed roll 5, is a bar 9 to which is secured by means of bolts 10 or the like, an arm 11 arranged at substantially right angles to bar 9 and positioned in longitudinal direction with respect to the bed I of the machine. Preferably, the free extremity of arm 11 is bent downwardly as shown at 12, to carry a bearing bracket 13. This bearing bracket 13 is provided with a slot 14 through which passes a lock bolt 15 for fixedly connecting the bracket 13 to the bent portion 12 of the arm 11. The slot 14 provides convenient means for adjusting bracket 13 in a vertical direction on its supporting arm 11. A washer 16 may be interposed between the head of the bolt 15 and the adjacent portion of the bracket 13 to effect a more secure frictional engagement of the parts connected thereby. The bracket member 13 comprises a cylindrical bore adapted to constitute a bearing or journal 42 for journalling a stub shaft 17.

The stub shaft 17 projects from both sides of bracket member 13, and is substantially parallel to feed roll shaft 8. To one end of stub shaft 17 is securely attached, preferably by keying, a sprocket wheel 18. Sprocket chain 19 connects sprocket wheel 18 with the sprocket wheel 7 carried on feed roll shaft 8.

A movable heater element, here shown preferably as a metallic disc 20, is keyed or fixedly carried on the other end of the stub shaft 17 and is rotatable with shaft 17. The disc 20 is mounted with its plane in the direction of travel of formed paper web 30 between the feed rolls, and in contact with the seam formed by the overlapping edges of the paper web, or closely adjacent thereto in heat relation therewith, and hence its periphery moves with a tangential component of motion in the plane of the seam of the overlapping edges of the paper web. The relations between the diameters of feed roll 5 and disc 20 and their respective driving sprockets 7 and 18 may be so designed that disc 20 is driven with a peripheral speed substantially the same as the surface speed of movement of paper web 30 past disc 20 in contact therewith. However, I have found that better results are obtained if the ratios of these respective diameters are so designed that disc 20 is driven with a peripheral speed at its area of contact with the paper web a little slower than the speed of movement of the paper web past the sealing disc 20.

My heat sealing member, as more particularly shown in Figures 4 to 7 inclusive, comprise a metal disc 20 having parallel side walls, an outer smooth surface disposed to contact peripherally with the overlapping edges of the paper web to be sealed and of a width which is comparatively narrow or that equal to the surface of the paper web to be sealed together. This disc is provided with an annularly disposed recess 20' formed within one of its side walls and opening laterally therefrom for providing a hub portion 20" and an annular ring portion 21. A heating element 33 is arranged within said annular recess 20' of the disc substantially coplanarly therewith and in heat-exchange relation therewith for supplying heat to said disc member. The heat radiating peripherally from said disc member will contact with the coatings upon the paper web for causing the overlapping edges of the paper to be sealed. This heating element 33 comprises a ring of suitable insulating material having a resistance wire, preferably spiral in form, embedded therein and the opposite ends of this resistance wire being connected to the binding posts 34 carried by the ring of the heater element 33. A circular plate member 46 positioned between the hub portion 20" and the outer annular ring portion 21 of the disc fits over and closes the annular recess 20' for retaining the heating element 33 therein. This cover plate 46 is provided with a central aperture 48 and is attached to the disc 20 by screws 50 which are easily removable, thereby permitting the easy removal of the electrical heating element 33 from the disc, as shown in Fig. 7. When the cover plate 46 is applied to the disc 20, its outer face will lie flush with that of the hub portion 20" and the outer annular ring portion 21 of the disc.

The binding posts 34 of the heating element extend through an aperture formed within the cover plate 46 and also connected to these binding posts or terminals are the lead wires 35, which latter pass to the axis of the shaft 17 and axially of axis 17 through an axial bore or hollowed opened end 43 formed therein, to slip rings 36 and 37 carried on shaft 17 electrically insulated therefrom by insulating material 47. The electrical heating element 33 is mounted in heat exchange relation with the disc 20, and when suitable electrical energy is applied to terminals 34 through its connections, the disc 20 becomes heated.

Carried upon the bearing bracket 13 is a brush bracket 44 affixed thereto by screws 45. Brush bracket 44 carries brush members 38 and 39 which are respectively adapted to engage slip rings 36 and 37. Brushes 38 and 39 are connected to a suitable source of electrical energy by wires 40 and 41.

The size, construction, and heating element of the disc 20, are such that when the web of coated paper passes through the machine, heat will be supplied to the seams or edges of the paper to be connected together, at the proper temperature and for the proper length of time, in order that the wax or other treating substance applied to the paper, will first be melted, and the adhesive which in ordinary operation has been applied to the paper, will be permitted to flow into contact with the paper, and the cells or pores of the paper will be caused to expand and to permit the adhesive to be more freely absorbed by the fibres of the paper. While in ordinary practice, a suitable adhesive will have been applied to the formed edges of the paper web before reaching the sealing disc, there are some types of such treated papers for which it is not necessary to apply an adhesive, since the melted treating compound itself applies after hardening sufficient adhesion to constitute a good seal. When the adhesive is used, the application of heat from the sealing disc causes the adhesive to set more quickly, and when the heat is withdrawn, the wax or other treating substance so melted will be permitted to congeal about the same or edges of the paper so sealed together, whereby a moisture proof seal about the connection of the edges of the paper will be established. By providing the type of structure which has been described, in which the moving disc makes only a brief contact with a given point on the travelling web, practically no resistance is offered to the movement of the travelling web, thereby accelerating the rate of production.

It will be understood that my improved sealing device, which is supported forwardly of the feed rolls, may be easily removed from the bag machine when it is desired to make bags from ordinary papers which have not been treated with adhesive repellent compounds.

In operation, the separate portions 31 and 32 of the waxed or similarly treated paper from which bags are to be made, are formed by folding over mechanisms well known in the art provided in the usual bag making machines to form the web or bag tubing 30, from which the blanks to constitute individual bags are cut. There is a seam where the edges 31 and 32 overlap after being formed into web 30. As the formed web is drawn through the bite of feed rolls 5 and 6 by the action thereof, the heated sealing disc 20 applied heat to the overlapping edges and causes adhesion of the edges, as has been explained. The sealing disc 20 is cooperatively driven with feed roll 5 at a speed such that the peripheral speed of disc 20 at its area of contact with web 30 is substantially the same as the surface speed of web 30 past disc 20, or slightly less than said surface speed of the web, as has been explained.

It will also be understood that in normal operation, a suitable adhesive will have been applied to the respective overlapping edges while separate and before being formed into the web.

Upon leaving the heated sealing disc 20, the traveling web 30 will enter between the feed rolls 5 and 6 and be pressed thereby, causing the overlapping edges of the web to become firmly adherent, thus resulting in a strong seam. The electrical heater element 33 will maintain sealing disc 20 at the proper temperature for effectively applying heat to the seam, and because of the adjustable feature of the device, the position of the sealing disc 20 may be varied and adjusted to the point where it will be most effective.

Because of the fact that the sealing disc 20 is cooperatively driven with the feeding mechanism of the feed rolls, there is no interference between the operation of one with that of the other, and it is therefore not necessary to reduce or adjust the speed of the machine when the sealing disc 20 is employed, and since disc 20 is bodily displaceable with feed roll 5, the possibility of distorting or injuring the paper web when traversing that section of the machine, is obviated.

It is to be noted that when varying the length of the stub shaft 17 carrying the disc 20, said disc may be set at the proper position over the bed 1 of the machine to adequately contact with the overlapping edges of the travelling web.

Whereas, I have shown and described my heat sealing disc as applied to a bag making machine, it is of course to be understood that the same may be applied to or used in connection with automatic heat sealing and bread wrapping machines, or machines for forming paper bottles, boxes or like containers.

Manifestly, the construction herein shown is capable of considerable modification and such modifications as come within the scope of my claims, I consider within the spirit of my invention.

I claim:—

1. In a machine for making bags or the like containers from a web having overlapping edges and movable in said machine, a support, means for adjustably mounting said support above the web movable upon said machine, a shaft carried by and being laterally adjustable with respect to said support, a heat conducting member comprising a disc having parallel side walls, said disc being keyed to one end of said shaft and disposed to contact peripherally with the overlapping edges of said web, said disc having an annularly disposed recess formed within one of its side walls and opening laterally therefrom for providing a hub portion and an annular ring portion, an annular electrical heater element arranged within said annular recess in said disc substantially coplanarly therewith and in heat-exchange relation therewith for applying heat to said disc member for sealing said web, a plate positioned within said recess between the hub portion and an outer annular ring portion of one of the side walls of said disc and having its outer face lying flush with that of the hub portion and outer annular ring portion of the last mentioned side wall, means for detachably connecting said plate to said disc, a pair of contact terminals carried by said electrical heater element and projecting through an opening formed within said plate and means for supplying electrical energy to said contact terminals.

2. In heat sealing means for paper-bag-machines, the combination of a supporting frame, a driven shaft having a hollow opened end, means for adjustably mounting said driven shaft upon said supporting frame, a disc member keyed to the outer hollow opened end of said shaft, said disc member having an annular recess formed therein, an electrical heater element, means for removably supporting said electrical heater element within the annular recess of said disc, a pair of contact terminals carried by said electrical heater element, a pair of slip-rings rotatable with said shaft, conductor members extending through the hollowed opened end of said shaft and one of their ends electrically connected to said slip-rings, means for detachably and electrically connecting the opposed ends of said conductor members to said contact terminals of said heater element, a pair of brushes carried by said support and adapted to contact said slip-rings respectively, and means for supplying electrical energy to said brushes.

3. In a machine for making bags or the like containers from a web having overlapping edges and movable upon said machine, a drive shaft journalled upon said machine, a support, means for adjustably mounting said support above the web movable upon said machine, a driven shaft journalled within and laterally adjustable with respect to said support, means for operatively connecting said drive and driven shafts, a disc keyed to said driven shaft whereby the same will be rotatably and adjustably disposed in contact with the overlapping edges of said web, a heater arranged within said disc for applying heat to the overlapping edges of the web while in contact with said disc for effecting a seal therebetween, and means for supplying electrical energy to said heater arranged with said disc.

4. A heating device comprising a disc formed from a single piece of heat conducting material, said disc having a central shaft receiving opening extending therethrough and parallel side walls, one of the side walls of said disc having an annular recess formed therein arranged concentrically with said central shaft receiving opening forming a hub portion and an annular ring portion, an annular electrical heater element removably arranged within said annular recess substantially coplanarly therewith and in heat exchange relation with said disc for supplying heat to the periphery thereof, an annular plate positioned between the hub portion and annular ring portion of said disc for closing the opened end of the recess formed therein, means for detachably connecting said plate to said disc for retaining said heater element within the recess thereof, and means for conducting electrical energy to said heater element.

STUART MOORE.